(12) United States Patent
Misumi (10) Patent No.: US 7,481,343 B2
(45) Date of Patent: Jan. 27, 2009

(54) CONTAINER HOLDING STRUCTURE FOR VEHICLE

(75) Inventor: Takashi Misumi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 253 days.

(21) Appl. No.: 11/200,278

(22) Filed: Aug. 9, 2005

(65) Prior Publication Data

US 2006/0037984 A1   Feb. 23, 2006

(30) Foreign Application Priority Data

Aug. 23, 2004   (JP) .............................. 2004-242851

(51) Int. Cl.
*B60R 7/00* (2006.01)
*B60R 5/00* (2006.01)
*A47K 1/08* (2006.01)

(52) U.S. Cl. .................... 224/282; 224/484; 248/311.2; 296/37.1

(58) Field of Classification Search ................. 224/282, 224/484, 926, 275; 248/311.2; 296/37.1, 296/37.8
See application file for complete search history.

(56) References Cited

U.S. PATENT DOCUMENTS

| | | | | |
|---|---|---|---|---|
| 5,520,313 | A * | 5/1996 | Toshihide | 224/539 |
| 6,065,729 | A * | 5/2000 | Anderson | 248/311.2 |
| 6,682,116 | B1 * | 1/2004 | Okumura | 296/37.8 |
| 6,715,727 | B2 * | 4/2004 | Sambonmatsu | 248/311.2 |
| 6,866,319 | B2 * | 3/2005 | Hupfer | 296/37.8 |
| 7,226,029 | B2 * | 6/2007 | Hoshi | 248/311.2 |

FOREIGN PATENT DOCUMENTS

| | | | |
|---|---|---|---|
| JP | 2003-025893 | | 1/2003 |
| JP | 2003-048474 | | 2/2003 |
| JP | 2004-161206 | | 6/2004 |
| JP | 2004-217145 | | 8/2004 |
| JP | 2004284433 | A * | 10/2004 |

\* cited by examiner

*Primary Examiner*—Nathan J Newhouse
*Assistant Examiner*—Lester L Vanterpool
(74) *Attorney, Agent, or Firm*—Rankin, Hill & Clark LLP (57) ABSTRACT

A vehicular container holding structure includes a body with an opening at its top for holding containers, and a lid for opening and closing the opening. To hold containers of various sizes, the body has a partition member having a second bottom positioned upwardly of a first bottom defining a deepest bottom of the body.

12 Claims, 8 Drawing Sheets

CONTAINER HOLDING STRUCTURE FOR VEHICLE

FIELD OF THE INVENTION

This invention relates to a container holding structure for holding a beverage container such as a can or bottle in a passenger compartment.

BACKGROUND OF THE INVENTION

Vehicles such as passenger automobiles are provided with a container holding device called a cup holder for holding beverage containers. This kind of cup holder with a lid is proposed in Japanese Patent Laid-Open Publication No. 2003-48474, for example. This cup holder will be described with reference to FIG. 8 hereof.

Figure 8:
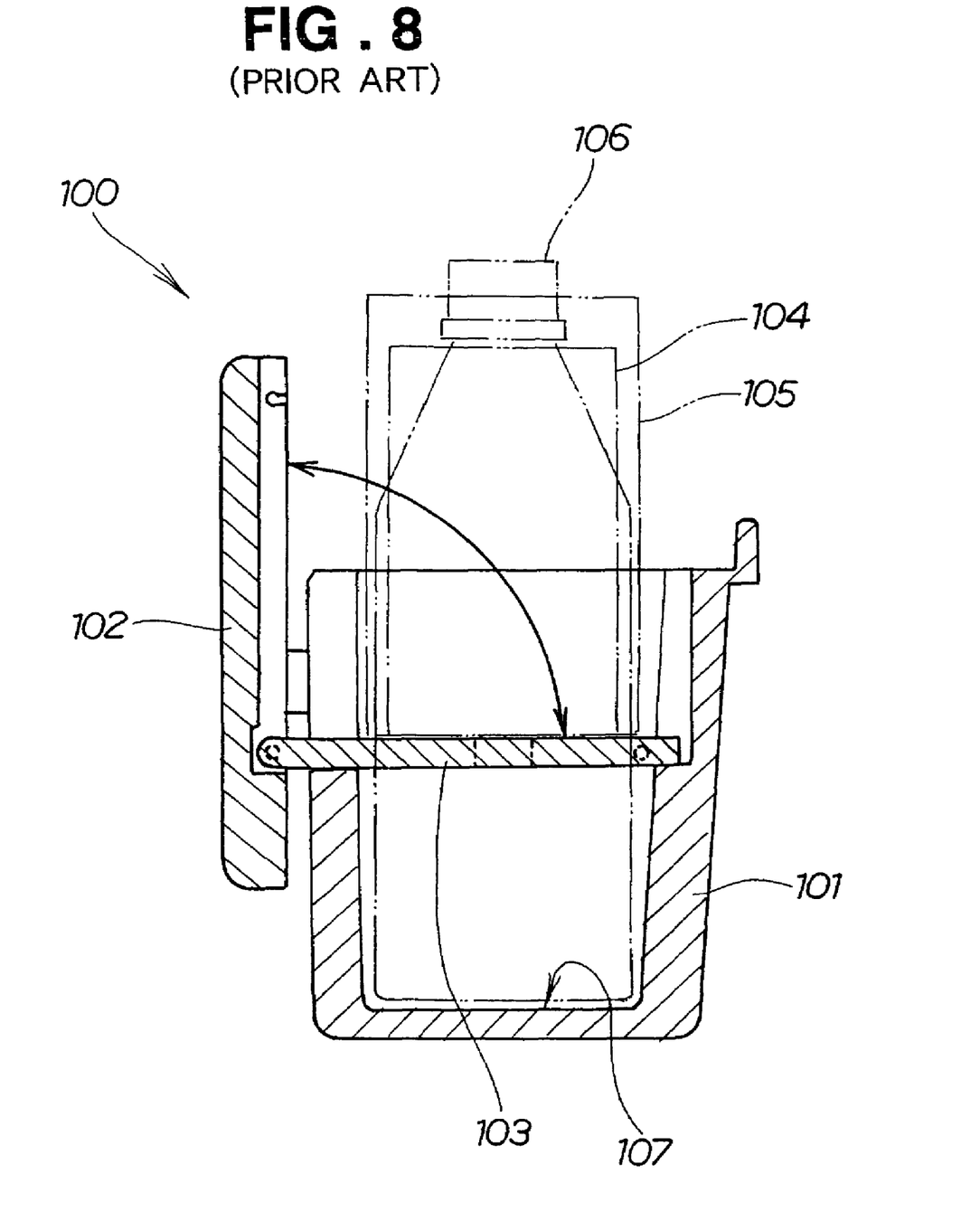
FIG. 8 is a cross-sectional view of a cup holder in the related art.

A cup holder 100 shown in FIG. 8 consists of a holder body 101 in a hollow shape opening at the top and having a first bottom supporting portion 107, a lid 102 provided at the holder body 101 in an openable and closable manner, and a second bottom supporting portion 103 provided at the lid 102 in such a manner as to be able to be turned up and down.

For short containers 104 and 105, the lid 102 is opened, and the second bottom supporting portion 103 is brought down from the lid 102 to a horizontal position. Then, the container 104 or 105 is placed on the second bottom supporting portion 103.

For a tall bottle 106, the lid 102 is opened. However, the second bottom supporting portion 103 is kept stored in the lid 102 without being brought down. Then, the bottle 106 is placed on the first bottom supporting portion 107 which constitutes the bottom of the holder body 101.

To hold the container 104, 105 or 106, it is always necessary to open the lid 102 regardless of the height of the containers 104, 105 and 106. When the container 104, 105 or 106 is held, it is impossible to close the lid 102 to utilize the top surface of the lid 102 as a surface on which to rest an elbow, for example.

When the second bottom supporting portion 103 is put in the horizontal position and the container 104 or 105 is placed thereon, touching the lid 102 will not only move the lid 102 but also move the second bottom supporting portion 103 in conjunction with it. This can shake the container 104 or 105 and spill the contents.

As described above, whenever the cup holder 100 is used, the lid 102 must be kept open. When the second bottom supporting portion 103 is used, care must be taken not to inadvertently touch the lid 102, which is not user-friendly.

Thus, there is demand for a container holding structure which allows a lid to be closed even in use, depending on the kind of container, and eliminates the possibility that touching the lid in an open state will cause spillage of the contents from a container.

SUMMARY OF THE INVENTION

According to an aspect of the present invention, there is provided a container holding structure for a vehicle, which comprises: a generally box-shaped body having at a top thereof an opening for allowing passage of a container into and out of the body; and a lid mounted to the body in such a manner as to be capable of opening and closing the opening, wherein the body includes a partition member having a second bottom positioned upwardly of a first bottom defining a deepest bottom of the body.

By virtue of the partition member having the second bottom within the generally box-shaped body and in a position above the bottom of the body, the structure is capable of holding a short-, regular- or long-sized container. If it is a short container, the lid can be closed, so that the top surface of the lid in a closed state can be utilized as a surface on which to rest an elbow, for example. Also, provision of the partition member at the body eliminates the possibility that touching the lid will shake the second bottom and cause spillage of drinking water from the container.

In a preferred form, the partition member is swingably mounted to the body to be able to be switched between an unused position along a wall of the body and a used position in which to be retained substantially parallel to the first bottom. A long-sized can or a plastic bottle is held with the partition member raised up.

It is preferred that the partition member has a rear surface provided with a container supporting surface in a circular arc shape for supporting the beverage container when the partition member is unused. Accordingly, the container can be supported by the container supporting surface and can be prevented from horizontal shaking.

A container upper portion supporting member for supporting an upper portion of the beverage container is mounted to the body or the lid in a storable and drawable manner. Supporting an upper portion of the beverage container by the container upper portion supporting member can effectively prevent horizontal shaking of the container.

The body is preferably provided with a lock mechanism to engage a distal portion of the partition member to lock the partition member when the partition member is used. The lock mechanism can thus hold down the distal portion of the partition member to prevent vertical shaking of the partition member.

The height from the second bottom to a bottom surface of the lid is preferably at least 103 mm. The height of short-sized containers currently commercially available is 103 mm or less. With such a container placed on the second bottom, the lid can be closed to utilize a top surface of the lid as a surface on which to rest an elbow, for example.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
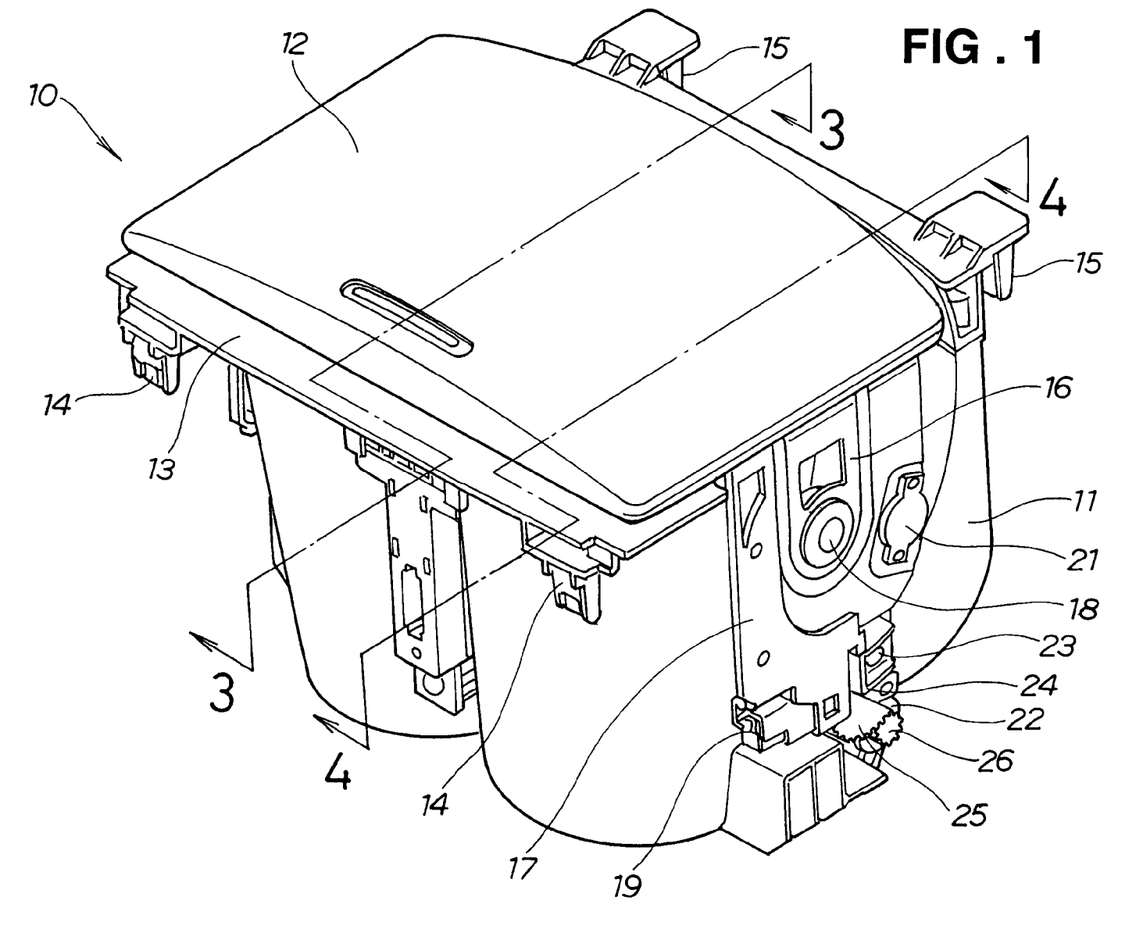
FIG. 1 is a perspective view of a container holding structure according to the present invention, with a lid closed.

A container holding structure 10 shown in FIG. 1 is a cup holder including a body 11 which can receive two beverage containers, and a lid 12 attached to the body 11 in an openable and closable manner.

The body 11 is provided with hooks 14, 14, 15, 15 at a top collar 13 thereof so that it can be hooked onto a center console box (not shown) on the vehicle body side. The body 11 is mostly inserted into the center console box, so that the body 11 does not protrude into the passenger compartment in a used state.

A main arm 16 and a sub-arm 17 are extended downward from the lid 12. The main arm 16 is secured to the body 11 by a hinge pin 18. The sub-arm 17 is provided with a first stopper 19 at its distal end. Reference numeral 21 denotes a lid rotary damper. The rotary damper 21 is a damping component including a disc housed in a case, a shaft protruded from the center of the disc and protruded from the case, and a viscous fluid introduced into the case. The disc thus rotates gently when torque acts on the shaft.

Figure 2:
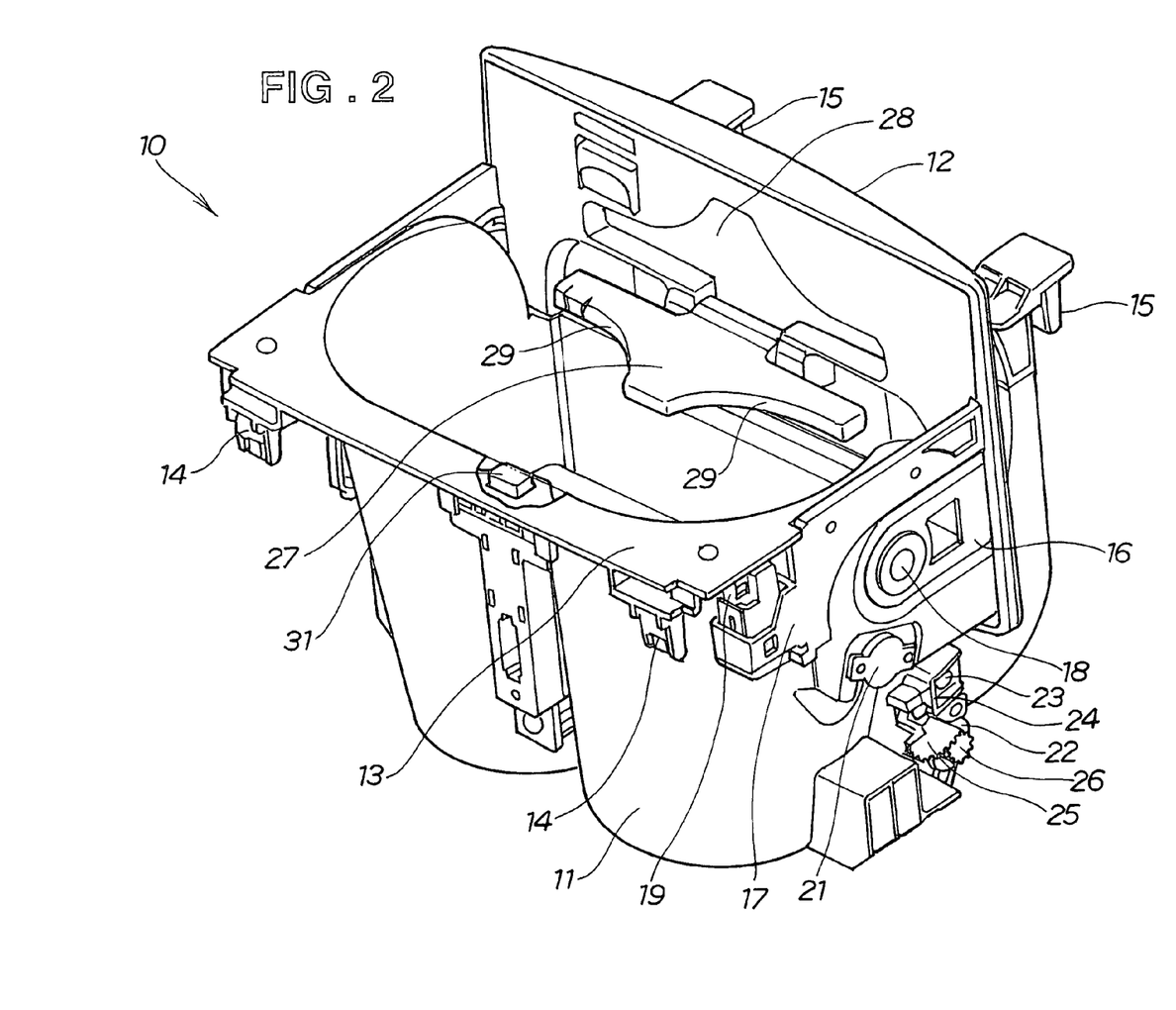
FIG. 2 is a perspective view of the container holding structure according to the present invention, with the lid open.

FIG. 2 shows the container holding structure 10 with the lid 12 open.

The lid 12 rotates on the hinge pin 18 to a fully open position. The opening and closing movement of the lid 12 is damped by the lid rotary damper 21, so that the movement is gentle. In the fully open position, the first stopper 19 abuts on the bottom surface of the top collar 13.

A rotary damper 22 for a partition member to be discussed below is provided in the vicinity of the lid rotary damper 21. An arm 24 is mounted on a partition-member shaft 23. A fan gear 25 is provided on the arm 24. The fan gear 25 is meshed with a pinion 26 attached to a shaft of the rotary damper 22. As a result, the partition-member shaft 23 rotates gently.

The lid 12 is further provided with a first container upper portion supporting member 27. The first container upper portion supporting member 27 can be stored in a pocket 28 and drawn out from the pocket 28 to be in a horizontal position by hand. The first container upper portion supporting member 27 is a generally cruciform plate member, and includes curved guide surfaces 29, 29 for retaining a can or bottle.

Reference numeral 31 denotes an unlocking button, whose function will be described below. The unlocking button 31 can be operated only when the lid 12 is opened.

Figure 3:
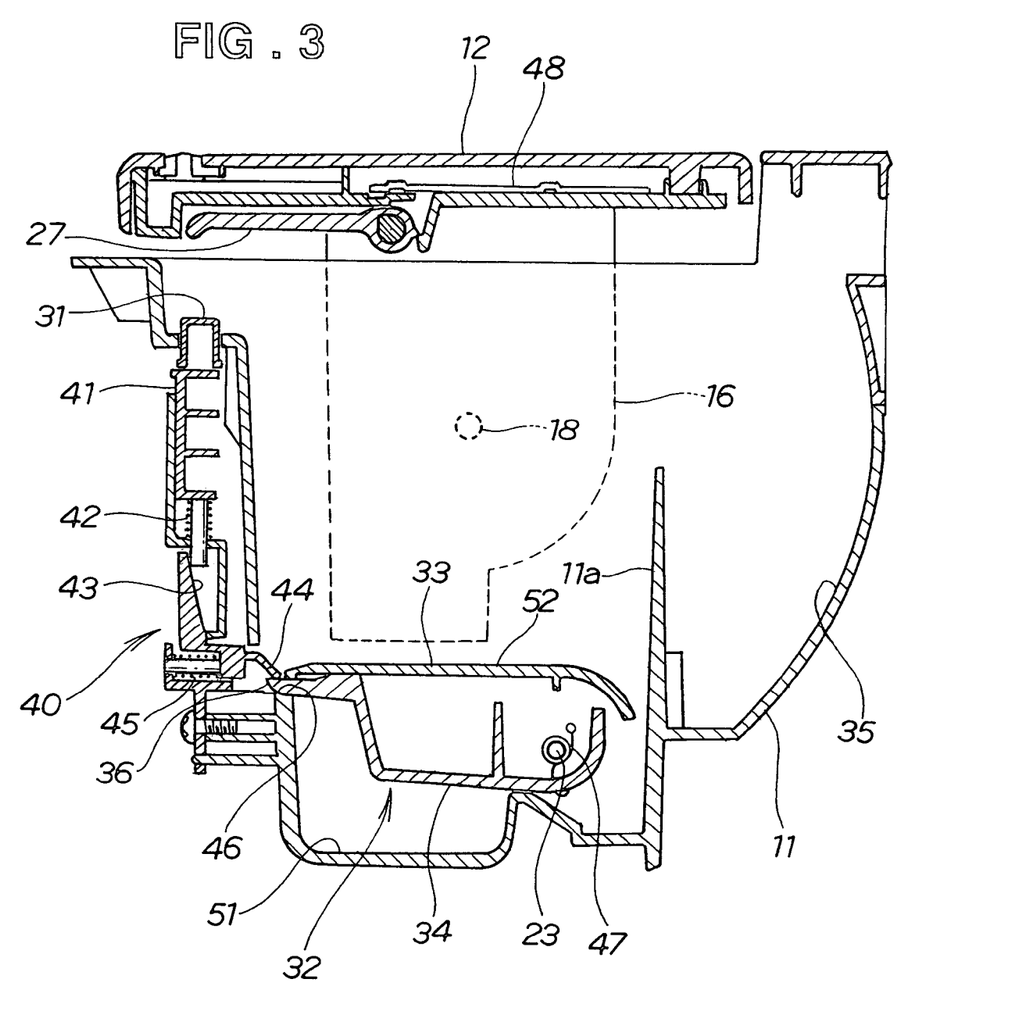
FIG. 3 is a cross-sectional view taken along line 3-3 in FIG. 1.

As shown in FIG. 3, the partition member 32 is configured to have an upper half body 33 and a lower half body 34 produced separately and integrated to facilitate its resin molding. Reference numeral 35 denotes a lid pocket for receiving the lid 12.

A lock mechanism 40 for locking a distal portion 36 of the partition member 32 includes, for example, the unlocking button 31, a transmission member 41 for transmitting the movement of the button 31, a return spring 42 for returning the transmission member 41, an inclined portion 43 for causing a locking portion 44 to horizontally move by the vertical movement of the transmission member 41, the locking portion 44 integrally formed with the inclined portion 43, and a spring 45 for biasing the locking portion 44 to a locking position.

Next, the operation of the lock mechanism 40 will be described.

When the partition member 32 is turned counterclockwise in the figure about the partition member shaft 23, the distal portion 36 pushes the locking portion 44, which is movable to the right and left in the figure, to the left in the figure. When the distal portion 36 is placed on a support surface 46 on the body side, the locking portion 44 is pushed out by the action of the spring 45, moving to the right in the figure. As a result, the distal portion 36 is pressed from above by the locking portion 44 to the support surface 46 on the body side. This eliminates the possibility that the partition member 32 will swing up and down.

Pressing the unlocking button 31 downward against the return spring 42 causes the locking portion 44 to move to the left in the figure by the action of the taper of the inclined portion 42. With this, the lock can be released. The partition member 32 rotates clockwise in the figure to an upstanding position by the action of a torsion spring 47.

A plate spring 48 provides resistance by its pressing force to a proximal portion of the first container upper portion supporting member 27 provided at the lid 12. This results in gentle movement of the first container upper portion supporting member 27. In addition, the provision of resistance to the first container upper portion supporting member 27 stabilizes the mounting position of the first container upper portion supporting member 27 with respect to the lid 12. There is no possibility of drooping of the first container upper portion supporting member 27 in the figure even when subjected to vibration from the vehicle body, for example.

Figure 4:
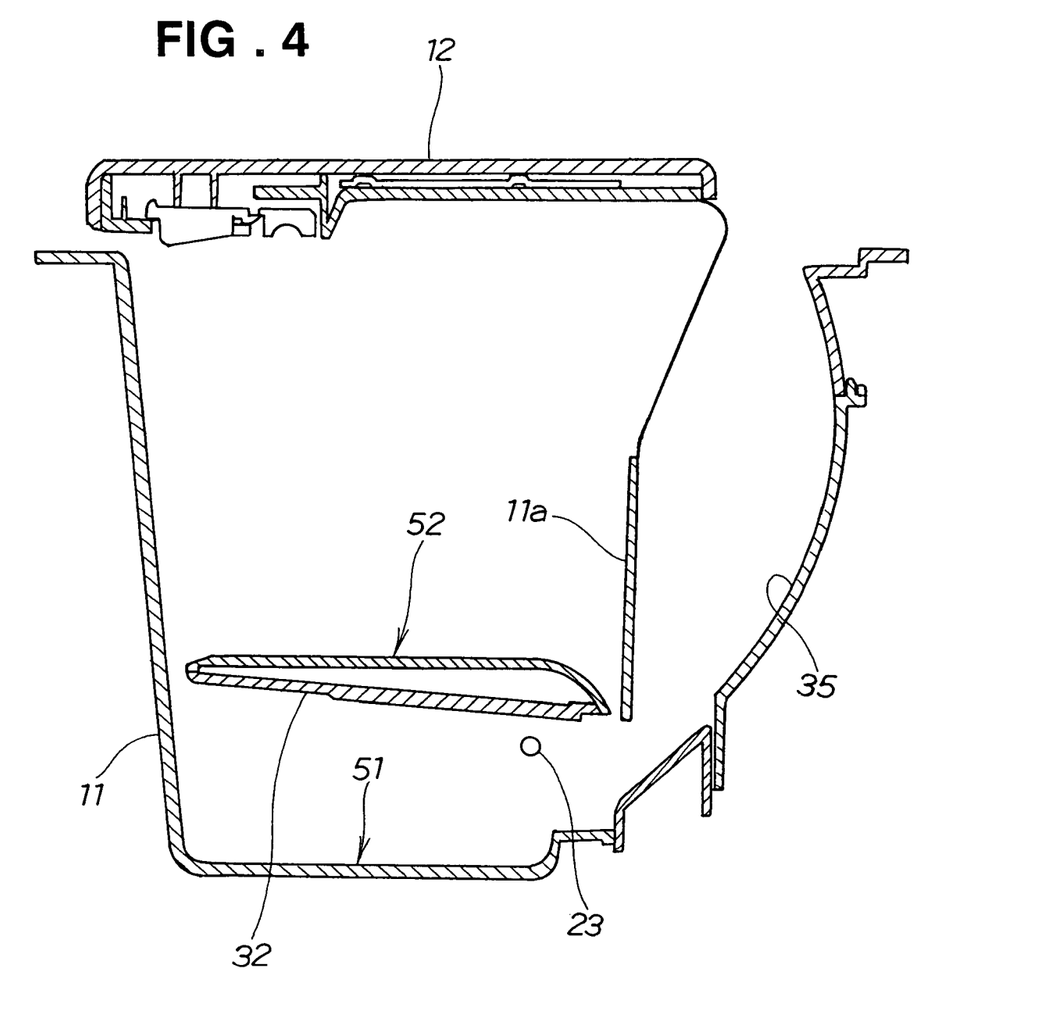
FIG. 4 is a schematic cross-sectional view taken along line 4 1 in FIG. 1.

As shown in FIG. 4, the partition member 32 has a relatively thinner portion. The reason will be described below. Reference numeral 51 denotes a first bottom, which allows, with a second bottom 52 formed at the top surface of the partition member 32, containers of various sizes to be placed thereon.

Figure 6:
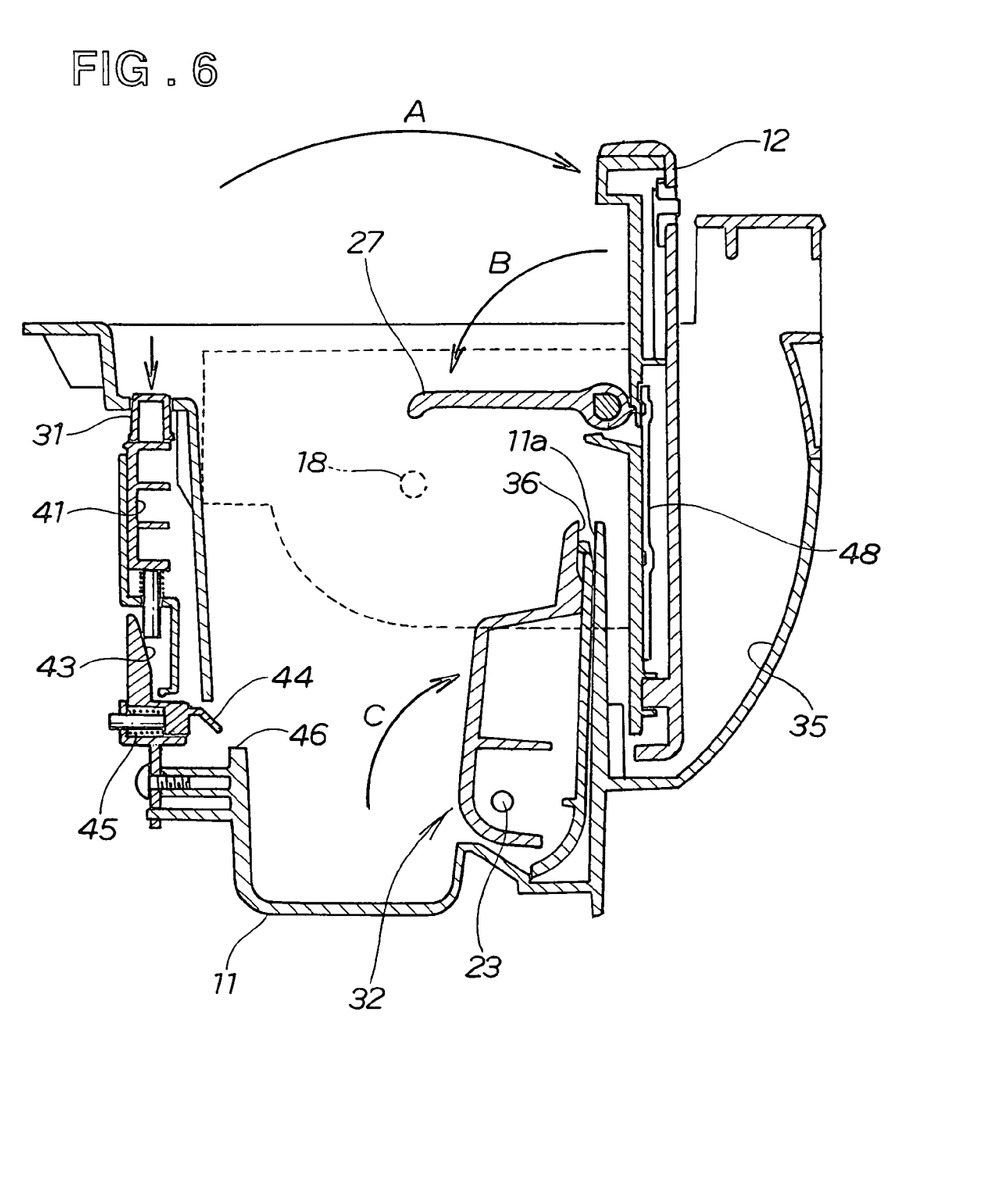
FIG. 6 is a cross-sectional view corresponding to FIG. 3, with the lid open.

When unused, the partition member 32 is put upright along a wall 11a of the body 11 (see FIG. 6).

Next, the partition member 32 shown in FIGS. 3 and 4 will be described with reference to FIGS. 5A and 5B.

Figure 5A:
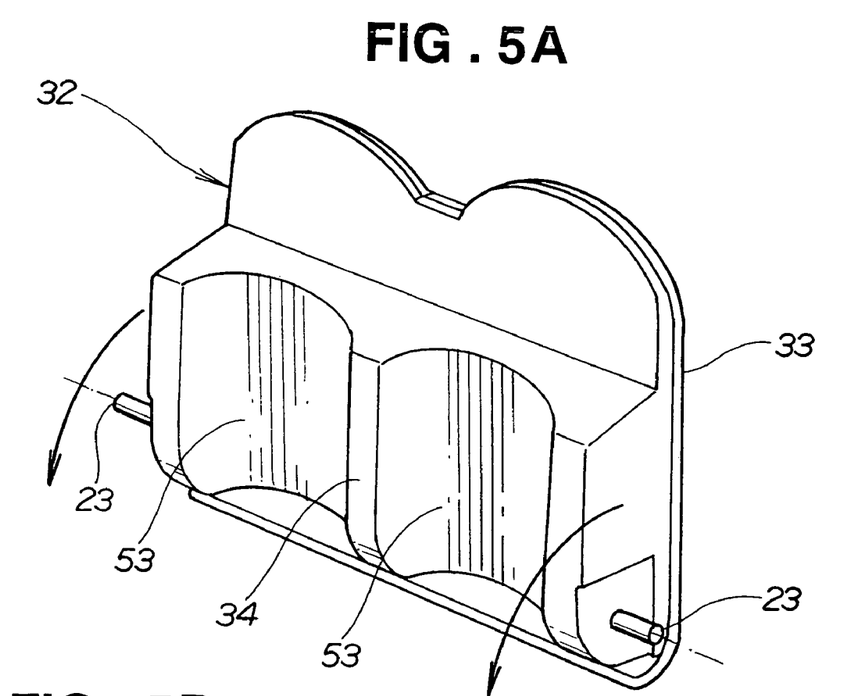
FIGS. 5A and 5B are perspective views of a partition member shown in FIG. 3.

As shown in FIG. 5A, the partition member 32 includes the upper half body 33 and the lower half body 34. The lower half body 34 (the rear surface of the partition member 32) is formed with container supporting surfaces 53, 53 of circular-arc-shaped recesses. The partition member 32 rotates about the partition member shafts 23, 23.

The partition member 32 is thick at the middle of the whole body, and is thin at middle portions of the container supporting surfaces 53, as is clear from the figure.

Figure 5B:
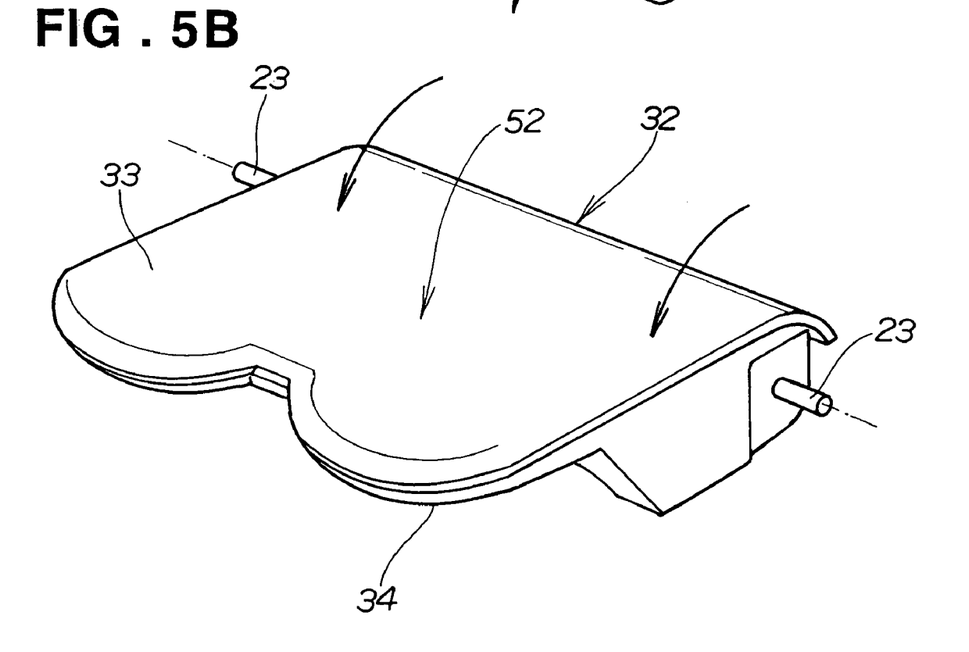

Referring to FIG. 5B, the upper half body 33 has the second bottom 52. Containers can also be placed on the second bottom 52.

The lid 12 is opened as shown by arrow A in FIG. 6, and mostly received in the lid pocket 35. Subsequently, the first container upper portion supporting member 27 is drawn out from the lid 12 in the open state as shown by arrow B to a usable state. Pressing the unlocking button 31 downward causes the partition member 32 to rise as shown by arrow C to be in the unused state.

FIGS. 7A to 7D are explanatory diagrams of operations for containers of different sizes.

Figure 7A:
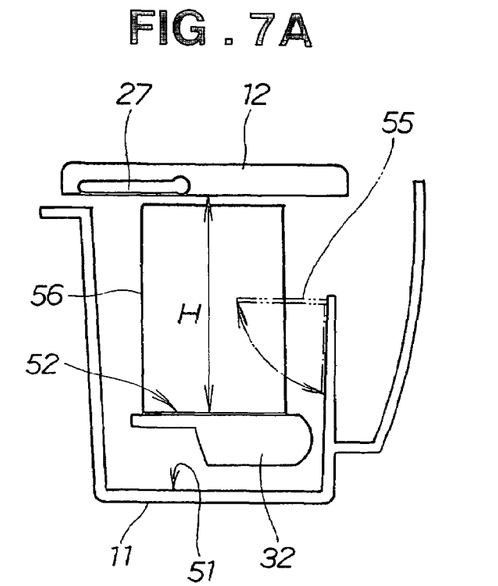
FIGS. 7A to 7D are diagrams showing holding states for containers of different sizes.

Referring to FIG. 7A, the height H from the second bottom 52 of the partition member 32 in the used state to the bottom surface of the lid 12 is at least 103 mm, and about 105 mm at the maximum. Therefore, with a short-sized can 56 placed on the second bottom 52, the lid 12 can be closed. The top surface of the lid 12 can be utilized as a surface on which to rest an elbow, for example.

Desirably, a second container upper portion supporting member 55 shown in imaginary lines is swingably mounted to the body 11 so as to be put in a horizontal position for preventing horizontal shaking of the can 56. Adoption of the second container upper portion supporting member 55 can omit the first container upper portion supporting member 27 attached to the lid 12. It is only necessary to provide either the first or second container upper portion supporting member 27 or 55 to the lid 12 or the body 11.

Figure 7B:
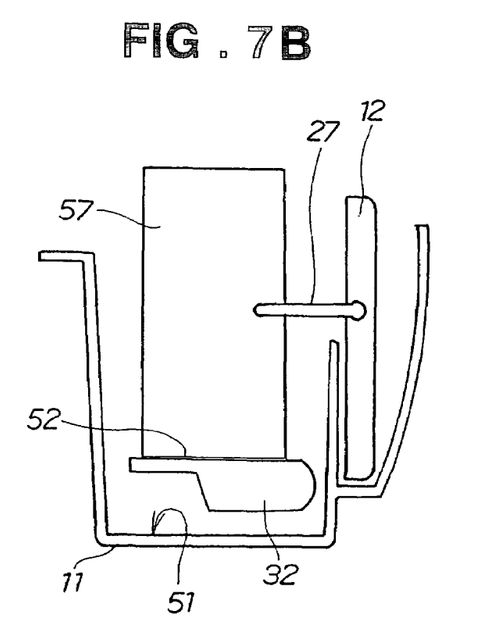

Referring to FIG. 7B, for a regular-sized or long-sized can 57, the lid 12 is opened; the first container upper portion supporting member 27 is put in the usable state; the partition member 32 is put in the used state; and the can 57 is placed on the second bottom 52.

Figure 7C:
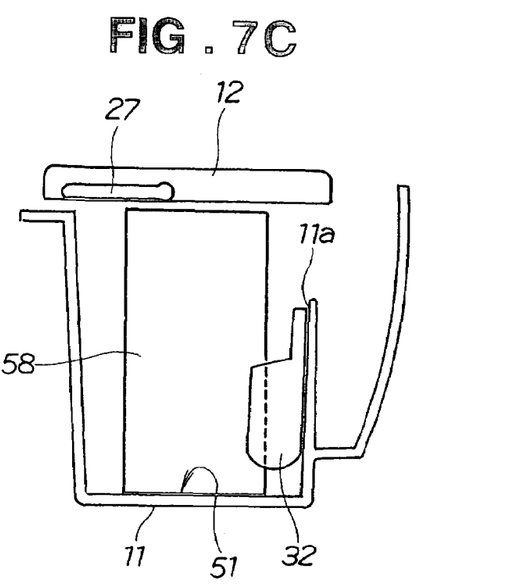

Referring to FIG. 7C, the partition member 32 is put upright; a regular-sized can 58 is placed on the first bottom 51; and the lid 12 is closed. The top surface of the lid 12 can be utilized as a surface on which to rest an elbow, for example.

Figure 7D:
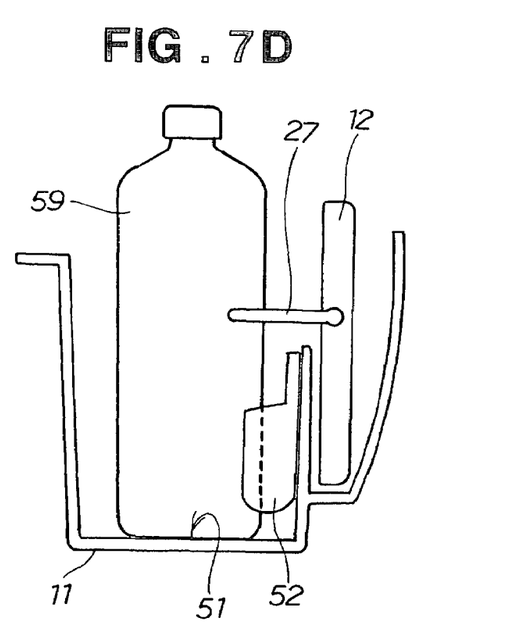

Referring to FIG. 7D, the partition member 32 is put upright; a long-sized bottle 59 is placed on the first bottom 51 with the lid 12 opened; and the first container upper portion supporting member 27 is put in the used state.

As shown in FIGS. 7A to 7D above, the opening or closing of the lid 12 and the turning up or down of the partition member 32 can be combined to desirably hold beverage containers of various sizes.

The partition member 32 in the present invention is not limited in mounting form to a rotatable one, and may be mounted to the body 11 in a rotatable, liftable, or drawable manner.

The present invention is suitable for use as a container holding structure to be placed in a vehicle center console box.

Obviously, various minor changes and modifications of the present invention are possible in the light of the above teaching. It is therefore to be understood that within the scope of the appended claims the invention may be practiced otherwise than as specifically described.

What is claimed is:

1. A container holding structure for a vehicle, comprising:
   a generally box-shaped body having at a top thereof an opening for allowing passage of a container into and out of the body, said body having a first bottom surface that defines a deepest bottom of the body;
   a lid mounted to the body in such a manner as to be capable of opening and closing the opening; and
   a container upper portion support member, mounted to the body or the lid in a storable and drawable manner, for supporting an upper portion of the container,
   wherein the body includes a partition member that is movable between a used position and an unused position, said partition member having a second bottom surface, said second bottom surface being positioned upwardly of and generally parallel to the first bottom surface when the partition member is in the used position,
   wherein the partition member defines, at a rear side thereof, an arcuate container supporting surface adapted to support the container when the partition member is in the unused position, wherein the arcuate container supporting surface is sized and shaped to support the container by partially surrounding the container.

2. The container holding structure as set forth in claim 1, wherein a distance from the second bottom surface to a lower surface of the lid is at least 103 mm.

3. The container holding structure as set forth in claim 1, wherein the partition member is swingably mounted to the body so as to be movable between the unused position in which the partition member is retained within the opening of the body and is therein disposed next to and generally parallel with a wall of the body, and the used position in which the partition member lies substantially parallel to the first bottom surface.

4. A container holding structure for a vehicle, comprising:
   a generally box-shaped body having at a top thereof an opening for allowing passage of a container into and out of the body, said body having a first bottom surface that defines a deepest bottom of the body; and
   a lid mounted to the body in such a manner as to be capable of opening and closing the opening;
   wherein the body includes a partition member that is movable between a used position and an unused position, said partition member having a second bottom surface, said second bottom surface being positioned upwardly of and generally parallel to the first bottom surface when the partition member is in the used position,
   wherein the partition member defines, at a rear side thereof, an arcuate container supporting surface adapted to support the container when the partition member is in the unused position, wherein the arcuate container supporting surface is sized and shaped to support the container by partially surrounding the container,
   wherein the body includes a lock mechanism for engaging with a distal portion of the partition member to thereby lock the partition member when the partition member is used.

5. The container holding structure as set forth in claim 4, wherein a distance from the second bottom surface to a lower surface of the lid is at least 103 mm.

6. The container holding structure as set forth in claim 4, wherein the partition member is swingably mounted to the body so as to be movable between the unused position in which the partition member is retained within the opening of the body and is therein disposed next to and generally parallel with a wall of the body, and the used position in which the partition member lies substantially parallel to the first bottom surface.

7. A container holding structure for a vehicle, comprising:
   a generally box-shaped body having at a top thereof an opening for allowing passage of a container into and out of the body, said body having a first bottom surface that defines a deepest bottom of the body;
   a lid mounted to the body in such a manner as to be capable of opening and closing the opening; and
   a container upper portion support member, mounted to the body or the lid in a storable and drawable manner, for supporting an upper portion of the container,
   wherein the body includes a partition member that is movable between a used position and an unused position, said partition member having a second bottom surface, said second bottom surface being positioned upwardly of and generally parallel to the first bottom surface when the partition member is in the used position,
   wherein the partition member has a first side and a second, opposite side, said first side defining said second bottom surface and facing upwardly when said partition member is in the used position, said second side facing toward said first bottom surface when said partition member is in the used position, and
   wherein the second side of the partition member defines an arcuate container supporting surface adapted to support the container when the partition member is in the unused position.

8. The container holding structure as set forth in claim 7 wherein a distance from the second bottom surface to a lower surface of the lid is at least 103 mm.

9. The container holding structure as set forth in claim 7, wherein the partition member is swingably mounted to the body so as to be movable between the unused position in which the partition member is retained within the opening of the body and is therein disposed next to and generally parallel with a wall of the body, and the used position in which the partition member lies substantially parallel to the first bottom surface.

10. A container holding structure for a vehicle, comprising:
- a generally box-shaped body having at a top thereof an opening for allowing passage of a container into and out of the body, said body having a first bottom surface that defines a deepest bottom of the body; and
- a lid mounted to the body in such a manner as to be capable of opening and closing the opening;
- wherein the body includes a partition member that is movable between a used position and an unused position, said partition member having a second bottom surface, said second bottom surface being positioned upwardly of and generally parallel to the first bottom surface when the partition member is in the used position,
- wherein the partition member has a first side and a second, opposite side, said first side defining said second bottom surface and facing upwardly when said partition member is in the used position, said second side facing toward said first bottom surface when said partition member is in the used position, and
- wherein the second side of the partition member defines an arcuate container supporting surface adapted to support the container when the partition member is in the unused position,
- wherein the body includes a lock mechanism for engaging with a distal portion of the partition member to thereby lock the partition member when the partition member is used.

11. The container holding structure as set forth in claim 10, wherein a distance from the second bottom surface to a lower surface of the lid is at least 103 mm.

12. The container holding structure as set forth in claim 10, wherein the partition member is swingably mounted to the body so as to be movable between the unused position in which the partition member is retained within the opening of the body and is therein disposed next to and generally parallel with a wall of the body, and the used position in which the partition member lies substantially parallel to the first bottom surface.

* * * * *